United States Patent
Ge

(10) Patent No.: US 10,271,674 B2
(45) Date of Patent: Apr. 30, 2019

(54) COOKING ROBOT

(71) Applicant: Wu Ge, Beijing (CN)

(72) Inventor: Wu Ge, Beijing (CN)

( * ) Notice: Subject to any disclaimer, the term of this patent is extended or adjusted under 35 U.S.C. 154(b) by 181 days.

(21) Appl. No.: 15/395,239

(22) Filed: Dec. 30, 2016

(65) Prior Publication Data

US 2017/0188744 A1 Jul. 6, 2017

(30) Foreign Application Priority Data

Dec. 31, 2015 (CN) .......................... 2015 1 1032244

(51) Int. Cl.
| | |
|---|---|
| *A47J 27/14* | (2006.01) |
| *A47J 27/00* | (2006.01) |
| *A47J 47/01* | (2006.01) |
| *B25J 11/00* | (2006.01) |

(52) U.S. Cl.
CPC .............. *A47J 27/14* (2013.01); *A47J 27/002* (2013.01); *A47J 47/01* (2013.01); *B25J 11/008* (2013.01)

(58) Field of Classification Search
CPC .......... A47J 27/002; A47J 27/14; A47J 47/01; A47J 37/1209; A47J 37/1266; A47J 37/1295; A47B 77/08; A47B 77/022; A23C 2002/00; A23B 4/26; A23B 4/023
USPC ................... 99/325, 330, 403, 418, 483, 535
See application file for complete search history.

(56) References Cited

U.S. PATENT DOCUMENTS

| | | | | |
|---|---|---|---|---|
| 3,289,664 A | * | 12/1966 | Hewitt ................... | A47B 77/08 126/37 R |
| 5,915,851 A | * | 6/1999 | Wattrick ............... | A47B 77/022 4/619 |
| 2015/0208871 A1 | * | 7/2015 | Chang .................. | A47J 31/401 99/325 |
| 2015/0257596 A1 | * | 9/2015 | Vartanian ............. | F21V 33/008 99/325 |

FOREIGN PATENT DOCUMENTS

| | | |
|---|---|---|
| CN | 2502864 Y | 7/2002 |
| CN | 101006833 A | 8/2007 |
| CN | 101675855 A | 3/2010 |
| CN | 202723528 U | 2/2013 |
| CN | 103006076 A | 4/2013 |

(Continued)

*Primary Examiner* — Phuong T Nguyen
(74) *Attorney, Agent, or Firm* — Muncy, Geissler, Olds & Lowe, P.C.

(57) ABSTRACT

The present invention belongs to the field of automated and intelligent control of household appliances, and discloses a cooking robot, comprising a machine body, a feeding mechanism, a charging mechanism, a control system, a cooking mechanism and a dishes collecting mechanism; the control system being respectively connected to the feeding mechanism, the charging mechanism, the cooking mechanism and the dishes collecting mechanism, and configured to control the mechanisms to work. The cooking robot of the present invention respectively and independently packages all raw materials of the dishes according to the recipes in the factory by using a customized disposable accommodating device for the raw materials of the dishes, can save a lot of manpower and material resources by controlling the whole cooking process with an automatic control system, and has broad application space and good market prospects.

16 Claims, 14 Drawing Sheets

(56) References Cited

FOREIGN PATENT DOCUMENTS

| CN | 204708588 U | 10/2015 |
| CN | 105167567 A | 12/2015 |
| CN | 205521418 U | 8/2016 |

* cited by examiner

A-A

COOKING ROBOT

TECHNICAL FIELD

The present invention belongs to the field of automated and intelligent control of household appliances, which especially relates to a cooking robot.

BACKGROUND OF THE PRESENT INVENTION

Cooking is the most common daily task of the most Chinese housewives or househusbands, but the Chinese dishes require of lots of raw materials and a complex production process, many modern residents may not accomplish the cooking with ease, and a kitchen often becomes a severely affected area for the family health. The Chinese dishes are delicious but difficult to learn, requiring of much time and effort. Moreover, the oil fume generated from the kitchen will also be harmful to the human body. Based on this, household appliances, especially industry of kitchen appliances, have become a new field in urgent need of automation and intelligence. At present, there are cooking machines, cooking robots and the like in the prior patent applications.

However, in the current well known intelligent and automated technologies for cooking, the cooking machine and the cooking robot, before frying dishes, both require of manually preparing main and auxiliary ingredients in the kitchen and manually and semi-automatically feeding, because a frying pot is of an open or semi-open structure, and a raw material storage mechanism is difficult to clean and very inconvenient to dismounting and mounting, resulting in problems: the cooking machine and the cooking robot still require of artificially washing and cutting vegetables, nothing but only reduce small amount of labor in the frying process, and also have problems that the feeding is inaccurate and incorrect, the timing and quantitative feeding may not be achieved, the oil fume pollutes the indoor environment, the pot and stove also require of manually cleaning after frying, and the like, which not only is inconvenient, but also may not reduce manpower and time cost. Therefore, the housewives may not be freed from the kitchen basically.

SUMMARY OF THE PRESENT INVENTION

In order to overcome the technical problems of requiring manually and semi-automatically preparing raw materials and inaccurately feeding raw materials and the like in the prior art, the present invention provides a cooking robot which automatically controls cooking of the dishes by a system without preparing the raw materials. The computer program, the control technology and other mechanical structures, which are not specifically listed in this specification, are all technologies already widely used in the prior art, and these technologies are not innovations of the present invention, so that the technologies will not be described in detail here due to the space limitation, but may be acquired by an ordinary person skilled in the art through conventional means, and these contents all will be part of the specification.

A cooking robot of the present invention is provided, including a machine body, a feeding mechanism, a charging mechanism, a control system, a cooking mechanism and a dishes collecting mechanism, the control system being respectively connected to the feeding mechanism, the charging mechanism, the cooking mechanism and the dishes collecting mechanism, and configured to control the mechanisms to work. A cooking control program is provided in the control system.

Preferably, the feeding mechanism includes a feed inlet, a positioning bin and a raw material accommodating device. Wherein the raw material accommodating device is of a structure which is independent from the feed inlet and the positioning bin and can be detached from the cooking robot, for example, the raw material accommodating device may be a material accommodating dish or a material accommodating box divided into a plurality of independent accommodating spaces; a plurality of independent sections, configured to respectively accommodate the corresponding raw materials hermetically, are provided at the raw material accommodating device according to the actual demand of the raw materials required for cooking the dishes; through a manner of uniform order and delivery by a factory, the raw materials of the dishes required to be cooked are respectively and independently packaged in the independent sections in the factory according to the recipes, thereby avoiding steps of selecting, washing and cutting vegetables in the kitchen in the past. Of course, according to individual needs of a user, all or part of the raw materials may be placed into the raw material accommodating device, for example, when the cooking robot is provided with a water and oil filling mechanism, the raw materials of the dishes can not include water and oil; for another example, when the user does not like spicy food, the related raw materials of the dishes can leave out the corresponding raw material storage section. The raw material accommodating device is provided with an identification device; the control system is configured to identify the dishes required to be cooked in the raw material accommodating device through the identification device, and control the charging mechanism to charge the raw materials accommodated in the sections of the raw material accommodating device into the cooking mechanism according to the cooking requirement of the corresponding dishes for cooking; for example, the system may read the raw materials hermetically stored in each independent section of the raw material accommodating device through the identification device, and control the charging mechanism to charge the raw materials required by the dishes into the cooking mechanism under the control of the control program according to parameters such as time, temperature, raw material charging order and raw material charging amount, and control the cooking mechanism to accomplish cooking, and then put the dishes after being cooked into a dishes collecting container. The feed inlet may be provided with mechanical structures such as a sealing mechanism (e.g. a bin gate) and an automatic popup mechanism, thereby facilitating charging the raw material accommodating device and taking out the empty raw material accommodating device and residual waste. The positioning bin is further provided with a fixing mechanism which plays a role of fixing or loosening the raw material accommodating device during putting or taking out the raw material accommodating device.

The control system can add and/or delete and/or replace and/or update the recipes by storage in advance and/or an external memory device and/or a network afterwards. Technologies as download, analysis and automatic control according to the recipes of the dishes are all existing technologies, not repeated here.

Preferably, the identification device is a bar code and/or a two-dimensional code and/or an RFID electronic tag; for example, the codes of the cooking materials are encoded by a united format, and may include dishes type, smell, taste, color and other information of the cooking materials, and each cooking material corresponds to a unique code of the cooking material; the code of the cooking material consists of an upper case letter and four digits, in which the upper case letter represents the classification of the cooking material, and the first digit of the four digits from left to right represents a grouping identification, the same type of the cooking materials may be grouped into one group according to the smell, taste or color of the cooking materials, and the cooking materials in the same group employ the same grouping identification; the second digit and the third digit represent the codes of the cooking materials, the fourth digit represents number identification, and the cooking materials are divided into four types such as main material, auxiliary material, solid condiment and liquid condiment. Of course, according to the actual needs, the identification device can also be used in other ways.

The raw material accommodating device can accommodate the raw materials required by one or more dishes, for example, when the dishes are dishes requiring relatively simple raw materials, the same raw material accommodating device can also accommodate many dishes; the raw material accommodating device is a recyclable raw material accommodating device or a disposable raw material accommodating device. The parameters such as size dimension, thickness and space size of each section of the raw material accommodating device can be correspondingly set according to the specific data of the raw materials of the dishes, and these data can be identified by the control system through the identification device, the control system controls the charging device to one by one dismantle the sealing devices of the sections of the raw material accommodating device in order according to the recipes, so as to charge the cooking mechanism.

Preferably, the charging mechanism includes a dismantling device and a relative movement system, the relative movement system being connected to the cooking mechanism and/or the dismantling device and/or the positioning bin, in order to realize the relative movement between at least two of the positioning bin, the dismantling device and the cooking mechanism. The relative movement system may include at least one lifting mechanism; the cooking mechanism, the dismantling device and the positioning bin share one lifting mechanism or are respectively provided with a lifting mechanism. The cooking mechanism, the dismantling device and the positioning bin may be together connected to the relative movement system, or only one of the mechanisms may be connected to the relative movement system. The relative movement system may control one of the cooking mechanism, the dismantling device and the positioning bin to move. For example, when charging the raw materials of the dishes, the control system may control the positioning bin to move to the cooking mechanism according to the actual need for cooking the dishes, thereby reducing the impact for charging materials on the cooking mechanism, on the contrary, the control system may also control the cooking mechanism to move to the positioning bin; by such analogy, the control system may also be configured to control the dismantling device to move to the cooking mechanism and/or the positioning bin.

Preferably, the dismantling device is a manipulator, and the relative movement system is a first lifting device; one end of the manipulator is mounted on the first lifting device, and the other end thereof is provided with an unsealing device; the first lifting device is provided on an inner wall of the machine body; the unsealing device is a spiny portion and/or a knife and/or a pair of scissors and/or a cone. At this moment, both or one of the cooking mechanism and the positioning bin may also be connected to the first lifting device. When there is a need to charge the dishes to the cooking mechanism according to instruction of the control system, the cooking mechanism moves to the positioning bin, or the positioning bin moves to the cooking mechanism, thereby facilitating charging the raw materials.

Preferably, a fume and air exhaust mechanism and a pollutant filtering device which is configured to filter the cooking fume are arranged inside the machine body. Through these devices, on the one hand, it can avoid indoor air pollution; on the other hand, it controls the emission of pollutants to the outdoor atmosphere and has the effect of environmental protection.

Preferably, the control system includes a host, a display and a drive device, the drive device being respectively connected to the feeding mechanism, the charging mechanism, the control system, the cooking mechanism, the dishes collecting mechanism and the fume and air exhaust mechanism; the display is provided on an outer surface of the machine body; a control program, configured to display a control menu and/or a control interface through the display for a user to control the cooking robot, is arranged inside the host. The host of the control system may be a single chip microcomputer and/or PLC and/or industrial control host and the like. The control system is connected to the mechanisms and the portions through the drive device. The user can control the information such as the amount, the taste, the cooking degree and the like of the dishes on the display according to the preset program; for example, the user can select parameters such as amount of raw materials, cooking time and added condiments according to information such as personal taste, appetite, preference cooking degree of the dishes.

Preferably, the control system further includes a wired or wireless communication module, the communication module being connected to the host for receiving remote control information; the control system further includes an infrared signal transceiver for receiving control signals of a remote controller. The communication module is configured to receive the remote control signal, and specifically can control the cooking robot to cook the dishes in the manner of short message, WeChat, webpage operation, remote controller control and the like. For example, the user can reserve the raw material accommodating device through a WeChat port or other application ports, and the relevant manufacturers configure the corresponding raw materials in the raw material accommodating device in accordance with the user orders, and provide a home delivery service. When the cooking robot is provided with the raw material accommodating device, the user can also control the cooking robot as required to make relevant dishes at any time and any place with a network connection.

Preferably, the cooking mechanism, including a pot body, a heating device, a stir-frying mechanism and a first overturning mechanism, is arranged between the feeding mechanism and the dishes collecting mechanism, wherein the pot body and the heating device are connected to the machine body through the first overturning mechanism, and the pot body and the heating device are of a pot-stove integrated structure and/or a pot-stove separated structure; the heating device is an electric heating device and/or a gas heating device, such as an electric furnace, an induction cooker and a gas cooker (natural gas, methane or other fuels). The overturning mechanism can be achieved by a variety of manners, for example, by arranging a horizontal axis, the pot body and the heating device are connected to the machine body through the horizontal axis, and the overturning of the pot body is achieved by a manner of arranging a cylinder on one side of the pot body or the heating device; or, the overturning function can be achieved by a manner of driving the horizontal axis to rotate through a small motor. The overturning mechanism plays a role of overturning the pot body through the overturning mechanism after the dishes being cooked, thereby pouring the dishes out.

The overturning mechanism can be arranged inside a pot lid, or integrated with the manipulator, or mounted in a certain position of the machine body according to the actual needs.

Preferably, the cooking mechanism also includes a pot lid and a second overturning mechanism, the pot lid being connected to the machine body through the second overturning mechanism, and a non-open end of the pot lid and the positioning bin being configured to be in fixed connection and/or detachable connection. The specific setup of the second overturning mechanism can refer to the first overturning mechanism; the second overturning mechanism, when the pot lid and the positioning bin are fixedly connected or integrated, plays a role of overturning the raw material accommodating device to the bottom surface through the overturning mechanism, thereby facilitating charging the raw materials by the charging mechanism.

Preferably, a water supply system, including a water filling nozzle and a plurality of spray nozzles, is also arranged inside the machine body, and the water supply system is an external water pipe or a built-in drinking water bucket; the spray nozzles are connected to the control system through the drive device, and wash the cooking mechanism and/or fill the water to the cooking mechanism under the control of the control system; a plurality of drain outlets are further provided at the machine body. The parameters, such as number and mounting position of the spray nozzles and the drain outlets, can be actually set according to the user needs or the specific circumstances of the used cooking mechanism.

Preferably, an oil supply system, including a built-in oil barrel or an external oil inlet pipeline, is also arranged in the machine body, the oil supply system is connected to the control system through the drive device so as to supply oil to the cooking mechanism under the control of the control system.

Preferably, the dishes collecting mechanism includes a dishes collecting container inlet and a dishes container bracket. The dishes container bracket can be connected to the machine body. The dishes collecting container inlet can be provided with a sealing mechanism and an automatic popup mechanism, thereby facilitating charging the raw material accommodating devices and taking the dishes out. The sealing mechanism is a bin gate.

Preferably, a drying device and/or a sterilizing device, connected to the control system through the drive device so as to dry the cooking mechanism under the control of the control system, is further provided at the machine body; and the sterilizing device is connected to the control system through the drive device so as to sterilize the cooking mechanism and the robot under the control of the control system.

In order to adapt to the requirement of automatic cooking in large quantities, such as large restaurants and school dining halls, and the present invention also provides a robot capable of continuously and automatically cooking.

In addition to the technical features mentioned in the above specification, the cooking robot also includes the following technical features, the cooking robot is further provided with an automatic feeding system and an automatic waste recovery system; the automatic feeding system and the automatic waste recovery system are respectively connected to the control system; the control system is configured to control the automatic feeding system to feed the raw material accommodating device to the feed inlet, and control the automatic waste recovery system to recover the empty raw material accommodating device and the waste raw materials. Thus, the requirement of automatic and continuous cooking in large quantities can be achieved.

Preferably, the cooking robot is further provided with an automatic dishes container pushing system and a dishes storage system; the automatic dishes container pushing system and the dishes storage system are respectively connected to the control system; the control system is configured to control the automatic dishes container pushing system to actively add the dishes containers to the dishes collecting container inlet, and control the dishes storage system to store the accomplished dishes.

Preferably, the automatic feeding system includes at least one storage bin for the raw material accommodating device, the storage bin for the raw material accommodating device being connected to one side of the machine body provided with the feed inlet, and provided with a second lifting device and a first pushing mechanism.

Preferably, the storage bin for the raw material accommodating device is provided with a fresh keeping and/or freezing device.

Preferably, the automatic waste recovery system at least includes a recovering bin for the empty raw material accommodating device connected to one side of the machine body not connected to the feed inlet, and a recovering port for the empty raw material accommodating device is arranged at a connecting position of the machine body the same height as the feed inlet, and a third lifting device is provided at the recovering bin for the empty raw material accommodating device; and a raw material accommodating device conveyer is provided at the positioning bin of the feeding mechanism.

Preferably, the automatic dishes container pushing system at least includes a dishes container storage bin, the dishes container storage bin being connected to one side of the machine body provided with the dishes collecting container inlet, and provided with a fourth lifting mechanism and a container pushing mechanism.

Preferably, the dishes container storage bin is provided with a sterilizing device.

Preferably, the dishes storage system includes at least one dishes storage bin; the dishes storage bin is connected to one side of the machine body not connected to the dishes collecting container inlet, and a dishes container outlet is arranged at a connecting position the same height as the dishes collecting container inlet, and an automatic lifting shelf is provided at the dishes storage bin; a dishes container conveyer is arranged on the dishes container bracket.

Preferably, a heat preservation device is provided at the dishes storage bin.

In order to further improve the cooking ability of the large cooking robot, the present invention also provides a cooking robot with multi-machine body.

On the basis of the technical solution mentioned in above specification, the cooking robot includes at least two machine bodies of the robot, and the machine bodies share a set of control system and exhaust system.

The beneficial effects of the present invention are that the cooking robot, has self-cleaning stove, almost avoids all dirty works in the kitchen, saves time and energy, is convenient to use and can unskillfully cook a variety of dishes equivalent to those fried by a senior chef without washing, selecting, cutting and frying the vegetables. The sealed machine body can completely eliminate the indoor environmental pollution such as the cooking fume, which is beneficial to human health. Because the raw materials and processes are strictly controlled and independently sealed without a secondary pollution, moreover, the cooking process completely imitates a manual cooking process through a computer program, thereby not only ensuring the quality and taste of the dishes, but also ensuring food safety and achieving standardization, unification and diversification of the dishes. Further, continuous frying, timing frying and remote control frying can be achieved. It can maximally save manpower and material costs, reduce pollution, enhance the user experience and make cooking become a pleasure to reduce family conflicts of the modern home caused by the housework.

The technical solution of the present invention achieves full-automatic (continuous) cooking by a self cleaning function and the like of the stove.

The cooking robot provided by the present invention can achieve continuously cooking dishes on a large scale, and can largely save the operating cost of the public dining hall, the student canteen and the large restaurant.

Figure 1:
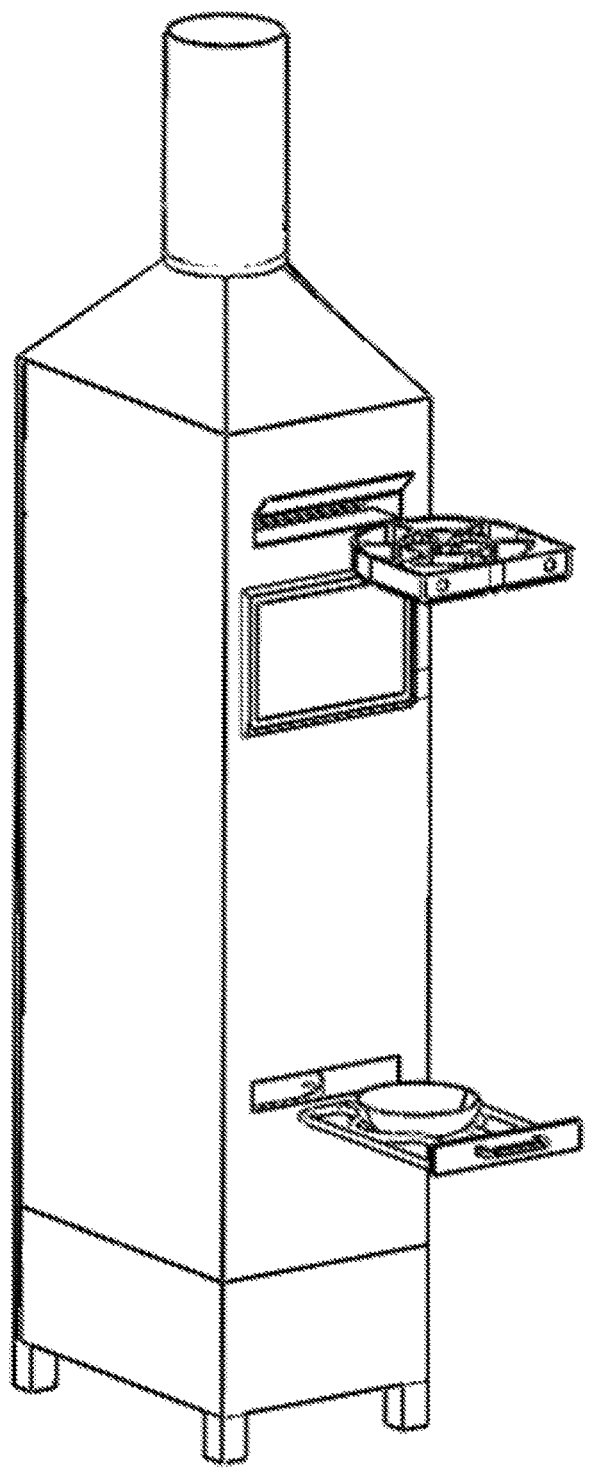
FIG. 1 is a schematic diagram of an appearance of a machine body of a cooking robot of the present invention.
Figure 2:
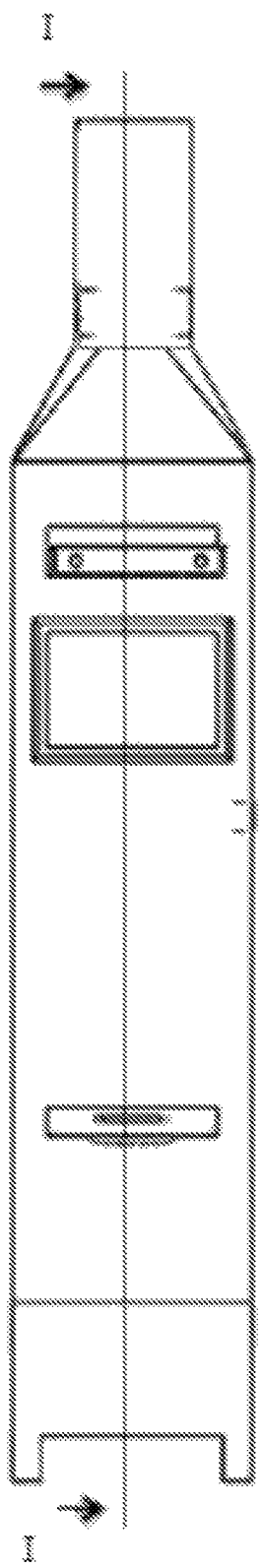
FIG. 2 is a main view of the machine body of the cooking robot of the present invention.
Figure 3:
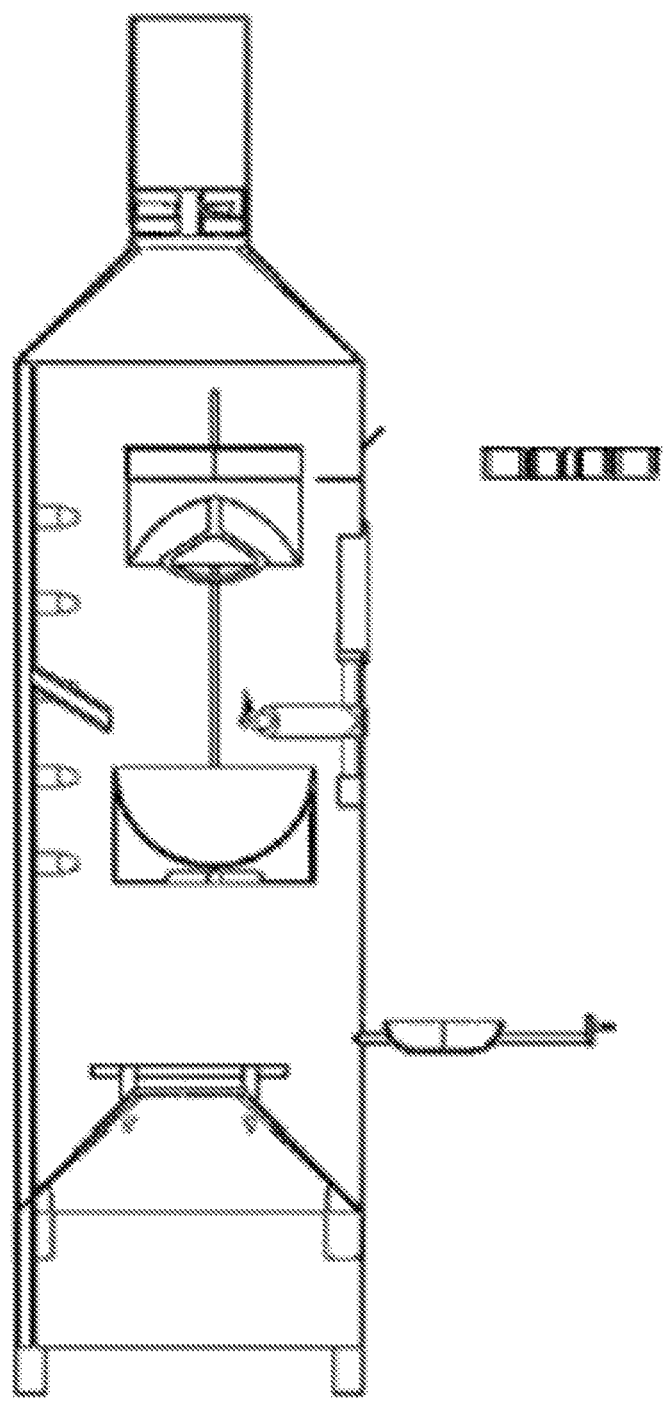
FIG. 3 is a section view of an I-I line of the cooking robot of the present invention.
Figure 4:
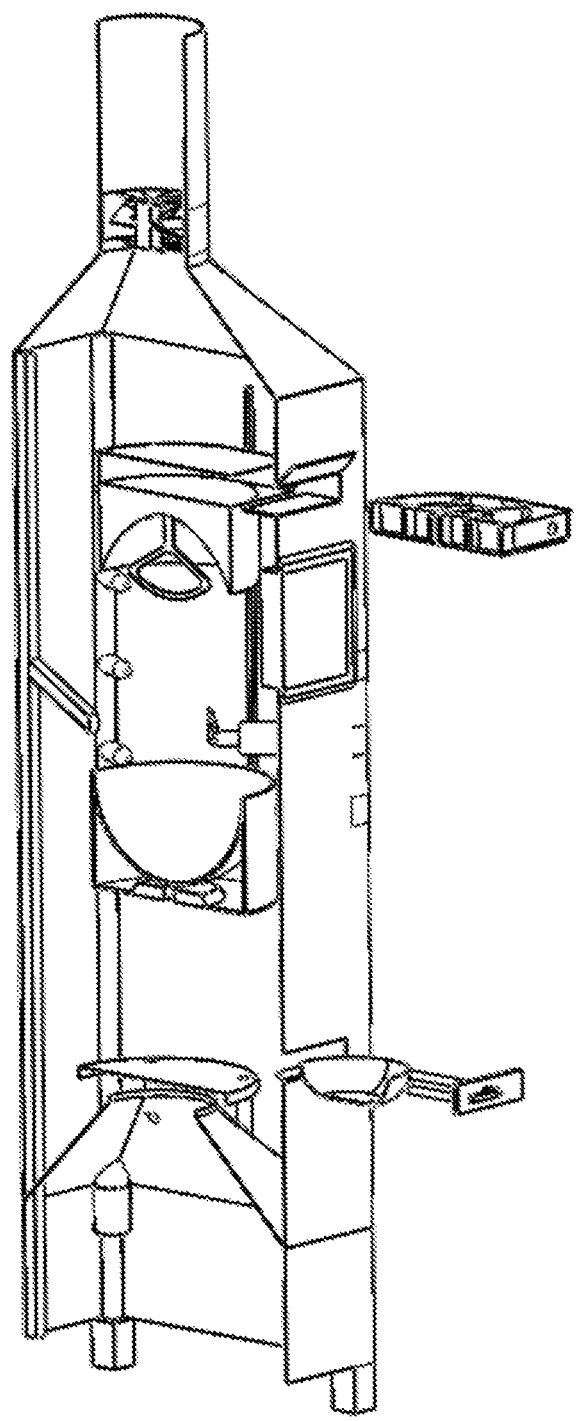
FIG. 4 is a three-dimensional section view of the I-I line of the cooking robot of the present invention.
Figure 5:
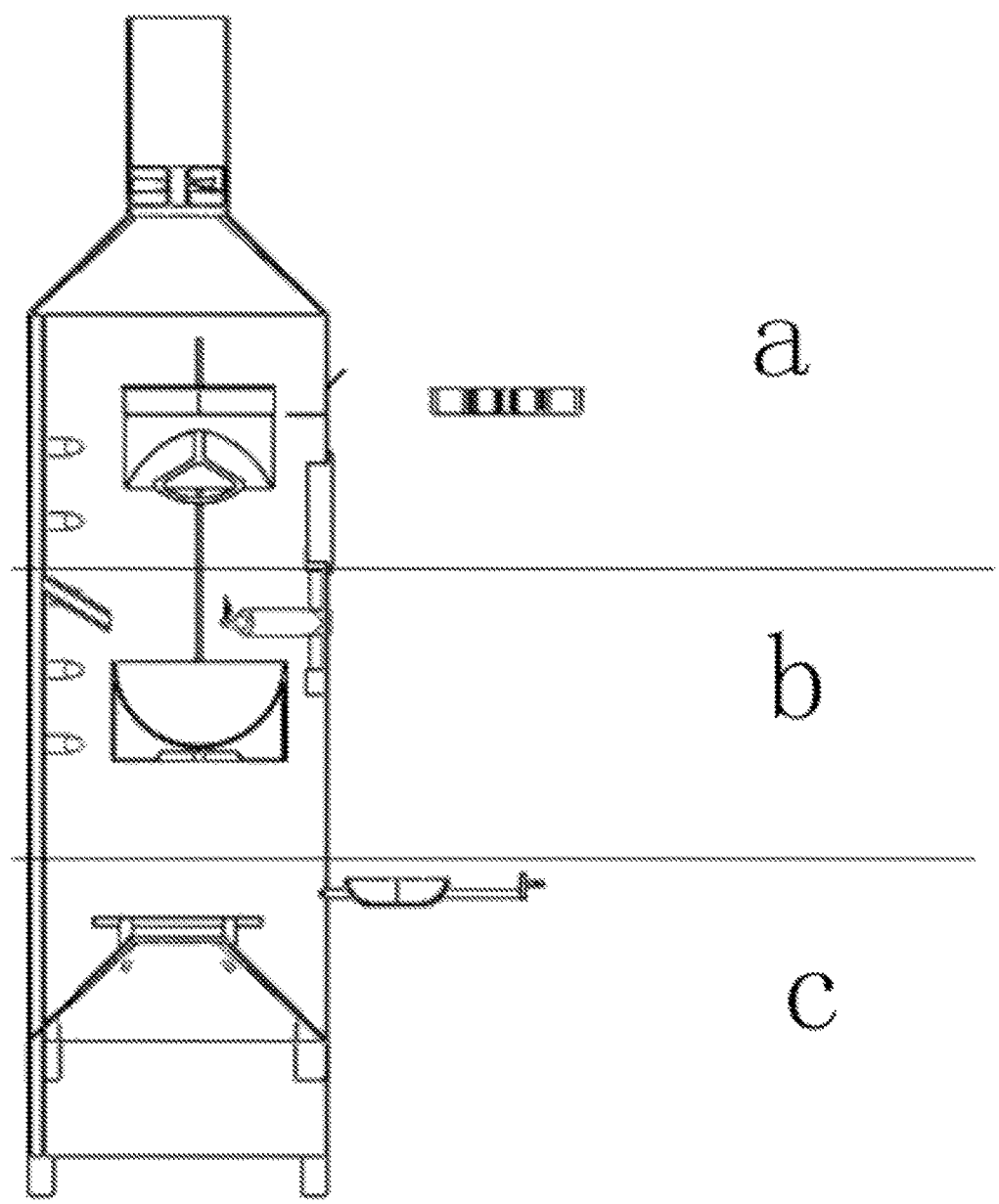
FIG. 5 is a section block diagram of the I-I line of the cooking robot of the present invention.
Figure 6:
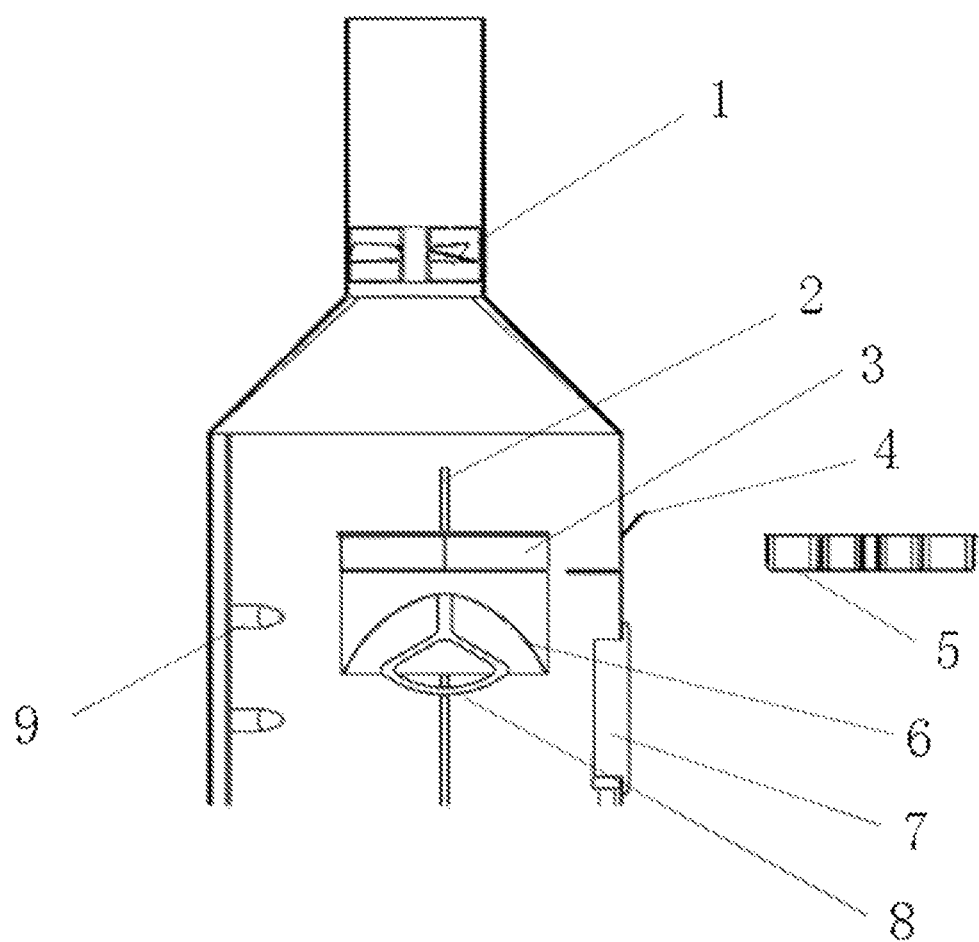
FIG. 6 is an enlarged view of the section a of the block diagram of the I-I line of the cooking robot of the present invention.
Figure 7:
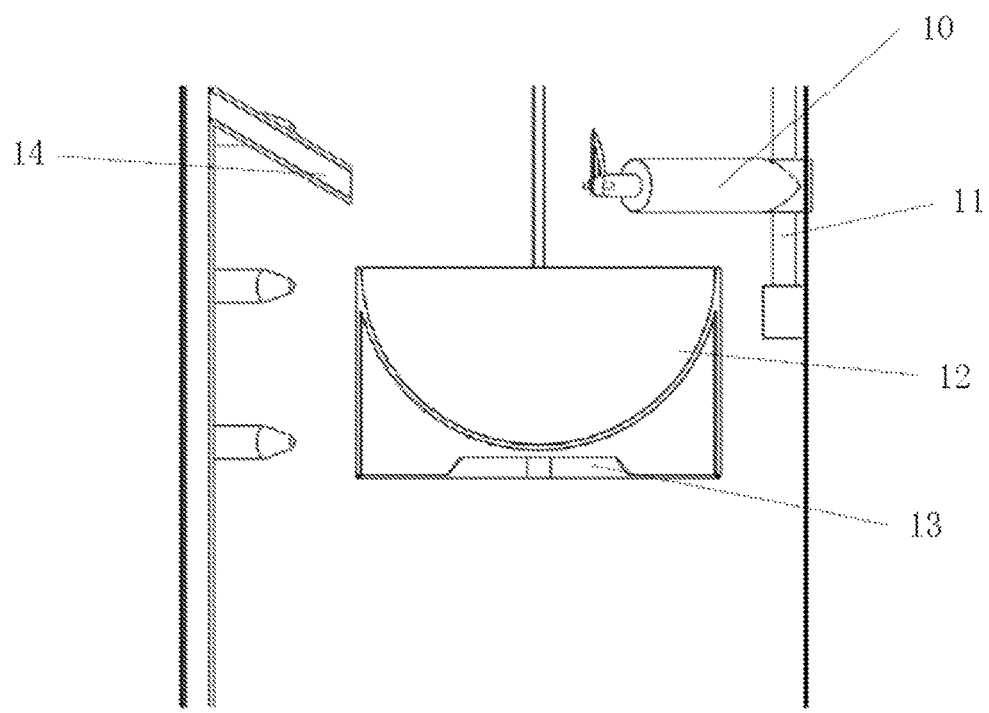
FIG. 7 is an enlarged view of the section b of the block diagram of the I-I line of the cooking robot of the present invention.
Figure 8:
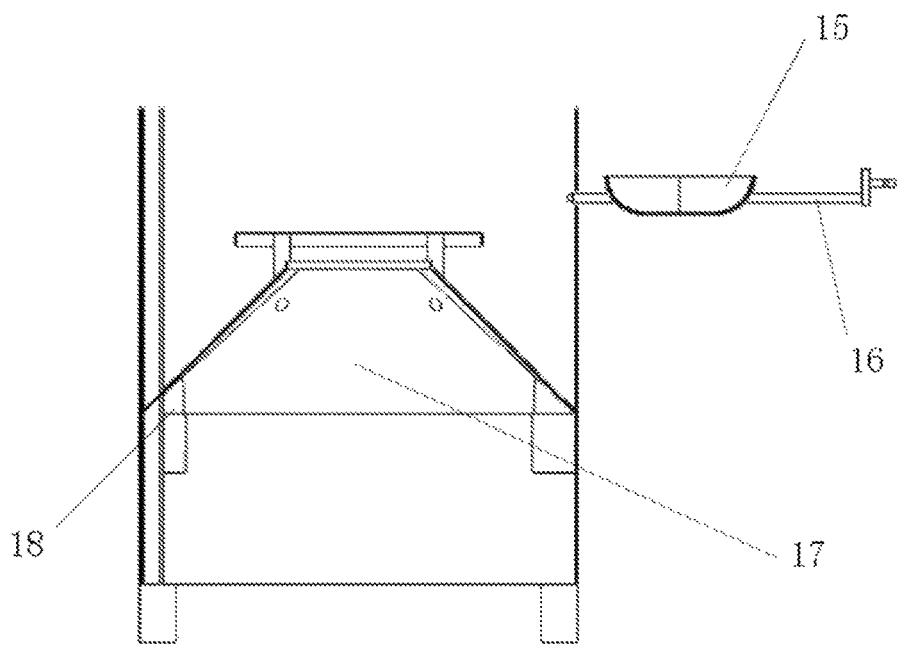
FIG. 8 is an enlarged view of the section c of the block diagram of the I-I line of the cooking robot of the present invention.

in which:
1: fume and air exhaust mechanism
2: lifting mechanism
3: positioning bin
4: feed inlet and bin gate
5: raw material accommodating device
6: pot lid
7: control system
8: stir-frying mechanism
9: spray nozzle
10: manipulator and unsealing device
11: manipulator lifting mechanism
12: pot
13: stove
14: water filling nozzle
15: dishes container
16: dishes container bracket
17: lower water-proof air inlet
18: drain outlet
19: diagram of embodiment of raw material accommodating device
20: second overturning mechanism
21: first overturning mechanism
22: raw material accommodating device conveyer
23: raw material accommodating device recovering bin
24: automatic lifting shelf
25: first pushing mechanism
26: container pushing mechanism
27: container conveyer.

DETAILED DESCRIPTION OF THE PRESENT INVENTION

In order to understand the technical solution of the present invention more easily, the technical solution of the present invention will be described clearly and completely with reference to the drawings by specific embodiments. It should be noted that the embodiments described here are not all implementation ways but only part of the embodiments of the present invention, and the embodiments are only examples which are merely used for providing more intuitive ways for the examiner and the public to understand the contents of the present invention, but not for limiting the technical solution of the present invention. Without departing from the conception of the present invention, an ordinary person skilled in the art may think of other implementation ways without paying any creative effort, and other simple replacements and variations shall be regarded as falling into the protection scope of the present invention.

Embodiment 1

Figure 9:
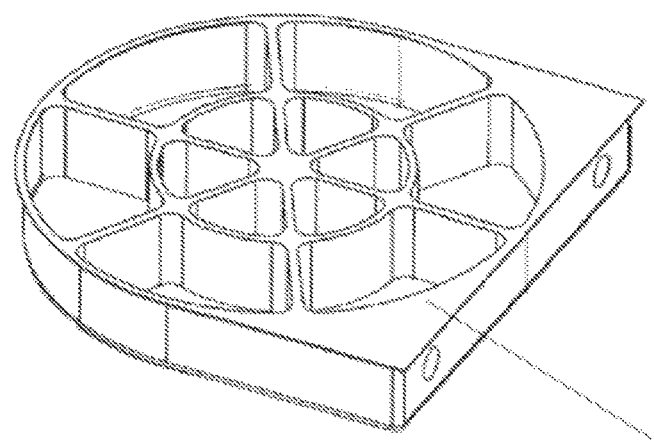
FIG. 9 is a structure diagram of an embodiment of a raw material accommodating device.
Figure 10:
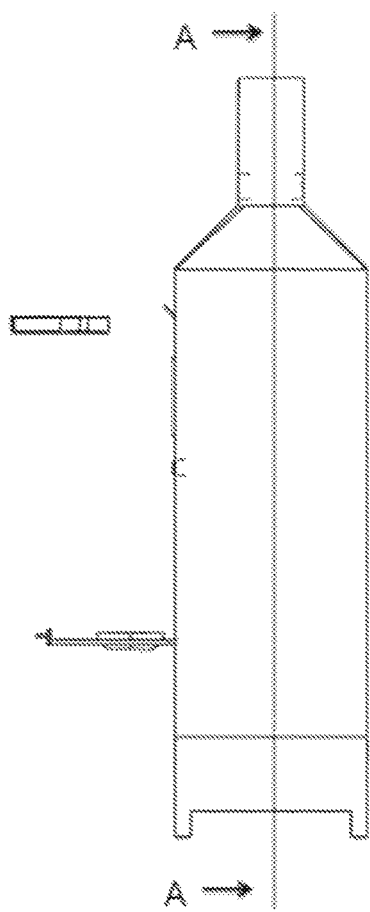
FIG. 10 is a side view of the machine body of the cooking robot of the present invention.
Figure 11:
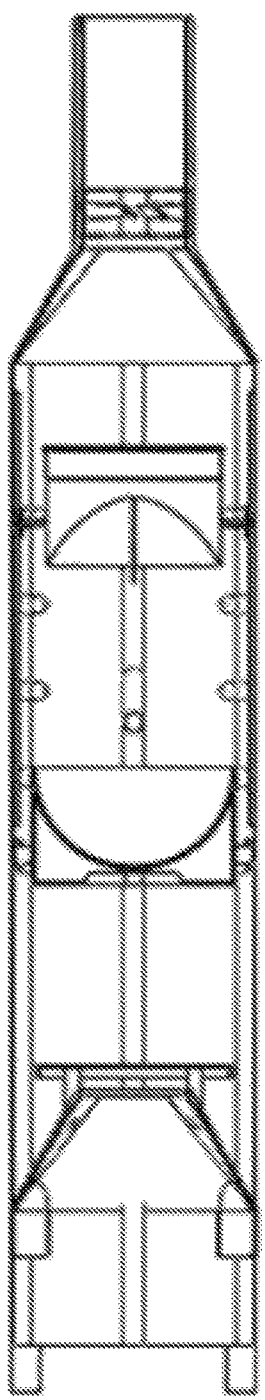
FIG. 11 is a section location view of an A-A line of the cooking robot of the present invention.
Figure 12:
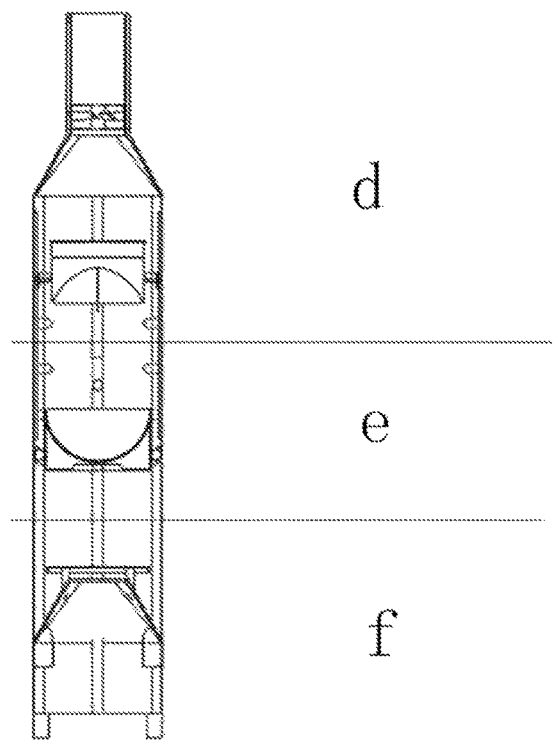
FIG. 12 is a section block diagram of the A-A line of the cooking robot of the present invention.
Figure 13:
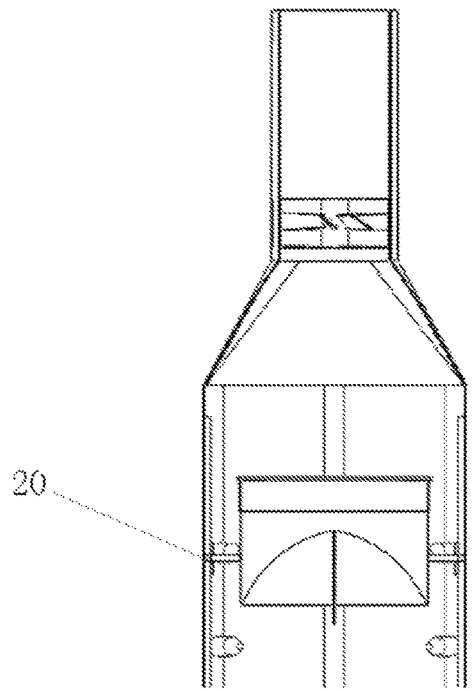
FIG. 13 is an enlarged view of the section d of the block diagram of the A-A line of the cooking robot of the present invention.
Figure 14:
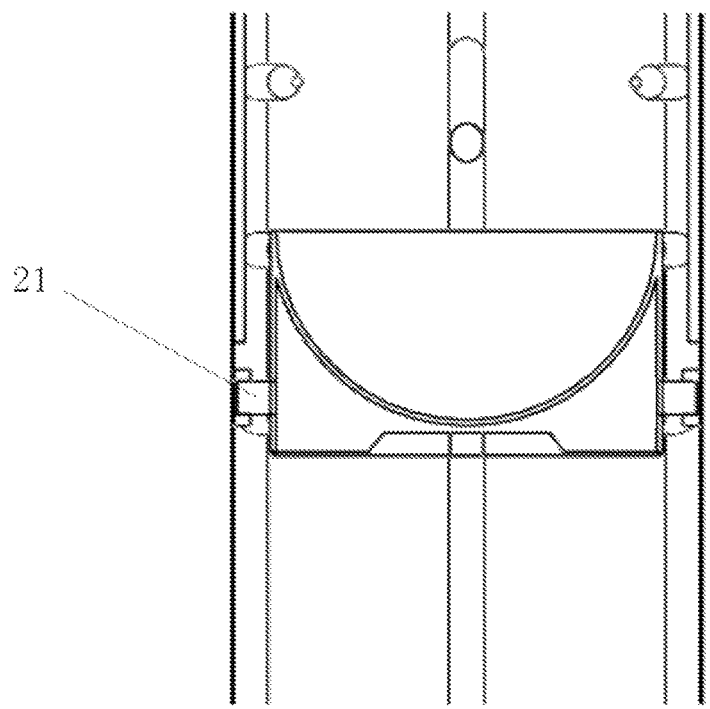
FIG. 14 is an enlarged view of the section e of the block diagram of the A-A line of the cooking robot of the present invention.
Figure 15:
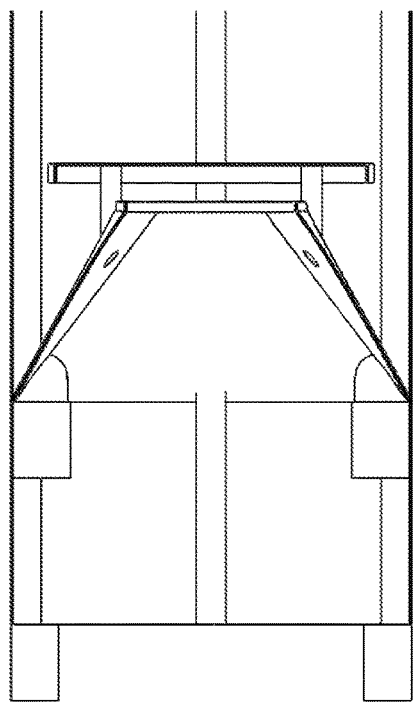
FIG. 15 is an enlarged view of the section f of the block diagram of the A-A line of the cooking robot of the present invention.
Figure 16:
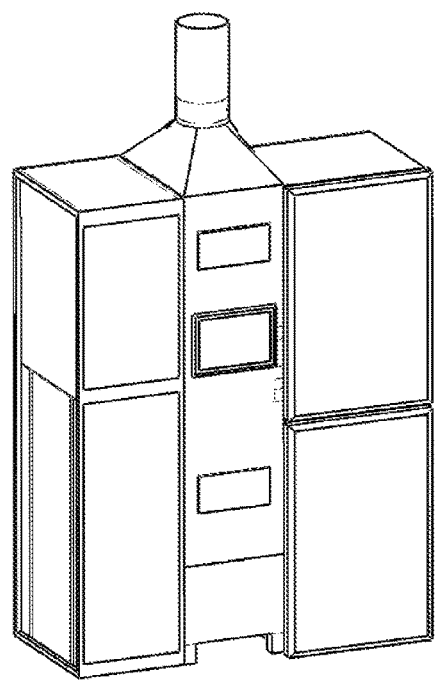
FIG. 16 is a three-dimensional external view of the embodiment with an automatic and continuous frying function of the present invention.
Figure 17:
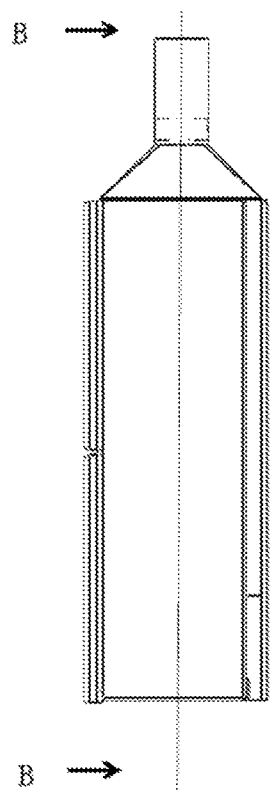
FIG. 17 is a side view of a B-B line of a continuous frying robot.
Figure 18:
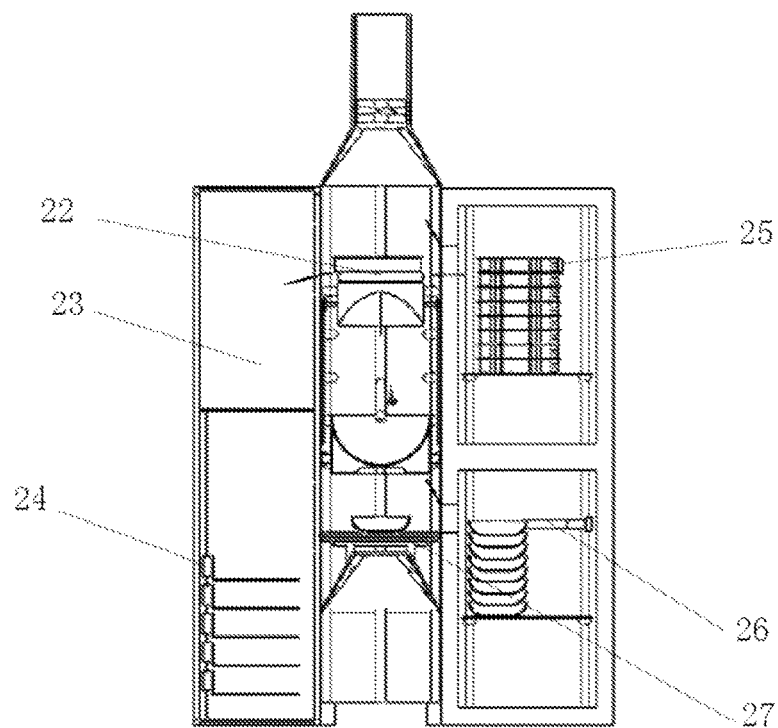
FIG. 18 is a section structure diagram of the B-B line of FIG. 15.
Figure 19:
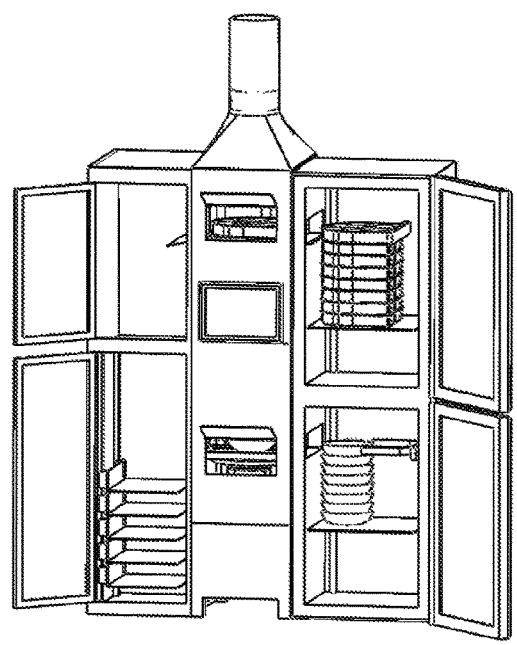
FIG. 19 is a stereo view of an internal structure of the embodiment with the automatic and continuous frying function of the present invention.

As illustrated in the FIG. 1 to FIG. 15, the present invention provides a cooking robot which saves manpower and cost and is free of preparation process. The cooking robot includes a machine body, a feeding mechanism, a charging mechanism, a control system 7, a cooking mechanism and a dishes collecting mechanism, characterized in that the control system is respectively connected to the feeding mechanism, the charging mechanism, the cooking mechanism and the dishes collecting mechanism, and configured to control the mechanisms to work. The feeding mechanism includes a feed inlet 4, a positioning bin 3 and a raw material accommodating device 5, wherein the raw material accommodating device is of a structure which is independent from the feed inlet and the positioning bin and can be detached from the cooking robot, a plurality of independent sections (with reference to number 19 in FIG. 9), configured to respectively accommodate the corresponding raw materials hermetically, are provided at the raw material accommodating device according to the actual demand of the raw materials required for cooking the dishes; the raw material accommodating device 5 is provided with an identification device; the control system is configured to identify the dishes required to be cooked in the raw material accommodating device through the identification device, and control the charging mechanism to charge the raw materials accommodated in the sections of the raw material accommodating device into the cooking mechanism according to the cooking requirement of the corresponding dishes in order for cooking. The control system can add and/or delete and/or replace and/or update the recipes by storage in advance and/or an external memory device and/or a network afterwards. The identification device is a bar code and/or a two-dimensional code and/or an RFID electronic tag; the raw material accommodating device can accommodate the raw materials required by one or more dishes, and is a disposable raw material accommodating device. The charging mechanism includes a dismantling device and a relative movement system, the relative movement system are connected to the cooking mechanism and/or the dismantling device and/or the positioning bin, in order to realize the relative movement between at least two of the positioning bin, the dismantling device and the cooking mechanism. The dismantling device is a manipulator 10, and the relative movement system is a first lifting device 11; one end of the manipulator 10 is mounted on the first lifting device 11, and the other end thereof is provided with an unsealing device; the first lifting device is provided on an inner wall of the machine body; the unsealing device is a spiny portion and/or a knife and/or a pair of scissors and/or a cone. The machine body is further provided with a fume and air exhaust mechanism 1 and a pollutant filtering device. The control system 7 includes a host, a display and a drive device, the drive device is respectively connected to the feeding mechanism, the charging mechanism, the cooking mechanism, the dishes collecting mechanism and the fume and air exhaust mechanism 1. The display is provided on an outer surface of the machine body; a control program, configured to display a control menu and/or a control interface through the display for a user to control the cooking robot, is arranged inside the host. The control system further includes a wired or wireless communication module, the communication module is connected to the host for receiving remote control information; the control system further includes an infrared signal transceiver for receiving control signals of a remote controller. The cooking mechanism, including a pot body 12, a heating device 13, a stir-frying mechanism 8 and a first overturning mechanism 21, is arranged between the feeding mechanism and the dishes collecting mechanism, wherein the pot body and the heating device are connected to the machine body through the first overturning mechanism, and the pot body and the heating device are of a pot-stove integrated structure; and the heating device is an electric heating device and/or a gas heating device.

The cooking mechanism also includes a pot lid 6 and a second overturning mechanism 20, the pot lid is connected to the machine body through the second overturning mechanism, and a non-open end of the pot lid and the positioning bin 3 are configured to be in fixed connection and/or detachable connection. The pot lid and the pot body share a lifting mechanism 2.

A water supply system, including a water filling nozzle 14 and a plurality of spray nozzles 9, is also arranged inside the machine body, and the water supply system is an external water pipe or a built-in drinking water bucket; the water supply system is connected to the control system through the drive device, and configured to wash the cooking mechanism and/or fill the water to the cooking mechanism under the control of the control system.

A lower water-proof air inlet, having a bottom being hermetically connected to the machine body and a top being of cone structure with a narrow-mouthed through hole, is provided at the bottom of the machine body. A dishes container bracket is fixed on the machine body or provided on the top of the water-proof air inlet through an air supporting structure. A plurality of drain outlets 18 are arranged the hermetic connection part between the bottom of the water-proof air inlet and the machine body.

The dishes collecting mechanism includes a dishes collecting container inlet and a dishes container bracket 16.

A drying device and/or a sterilizing device, connected to the control system through the drive device so as to dry the cooking mechanism under the control of the control system, is further provided at the machine body; and the sterilizing device is connected to the control system through the drive device so as to sterilize the cooking mechanism and the robot under the control of the control system.

Embodiment 2

As illustrated in the FIG. 16 to FIG. 19, the present invention provides a cooking robot with an automatically and continuously frying function, in addition to the technical features mentioned in the embodiment, further including an automatic feeding system and an automatic waste recovery system; the automatic feeding system and the automatic waste recovery system are respectively connected to the control system; the control system is configured to control the automatic feeding system to feed the raw material accommodating device to the feed inlet, and control the automatic waste recovery system to recover the empty raw material accommodating device and the waste raw materials.

The cooking robot is further provided with an automatic dishes container pushing system and a dishes storage system; the automatic dishes container pushing system and the dishes storage system are respectively connected to the control system; the control system is configured to control the automatic dishes container pushing system to actively add the dishes containers to the dishes collecting container inlet, and control the dishes storage system to store the accomplished dishes.

The automatic feeding system includes at least one storage bin for the raw material accommodating device, the storage bin for the raw material accommodating device is connected to one side of the machine body provided with the feed inlet, and provided with a second lifting device and a first pushing mechanism 25. The storage bin for the raw material accommodating device is provided with a fresh keeping and/or freezing device.

The automatic waste recovery system at least includes a recovering bin 23 for the empty raw material accommodating device connected to one side of the machine body not connected to the feed inlet, and a recovering port for the empty raw material accommodating device is arranged at a connecting position of the machine body the same height as the feed inlet, and a third lifting device is provided at the recovering bin for the empty raw material accommodating device; and a raw material accommodating device conveyer 22 is provided at the positioning bin of the feeding mechanism.

The automatic dishes container pushing system at least includes a dishes container storage bin, and the dishes container storage bin is connected to one side of the machine body provided with the dishes collecting container inlet, and provided with a fourth lifting mechanism and a container pushing mechanism 26. The dishes container storage bin is provided with a sterilizing device.

The dishes storage system includes at least one dishes storage bin; the dishes storage bin is connected to one side of the machine body not connected to the dishes collecting container inlet, and a dishes container outlet is arranged at a connecting position the same height as the dishes collecting container inlet, and an automatic lifting shelf 24 is provided at the dishes storage bin; a dishes container conveyer 27 is arranged on the dishes container bracket. A heat preservation device is provided at the dishes storage bin.

Embodiment 3

Figure 20:
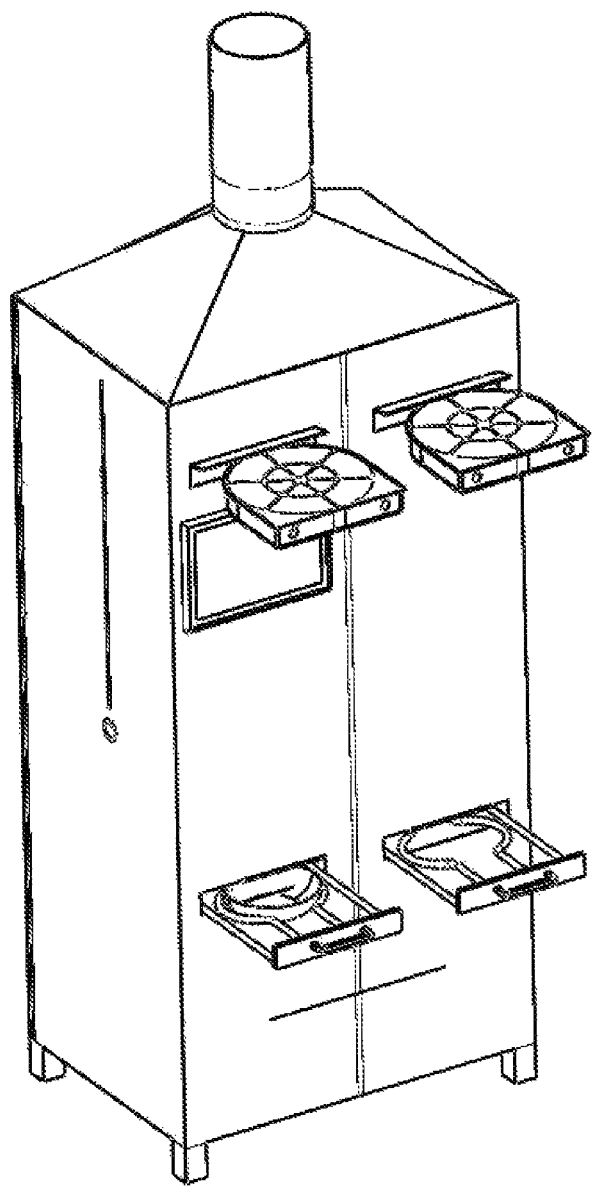
FIG. 20 is a stereo view of a frying robot with two machine bodies.

As illustrated in the FIG. 20, the present invention also provides a cooking robot with multi-machine body in order to further improve the cooking ability of the large cooking robot.

The robot includes two machine bodies of the cooking robot in embodiment 1 and/or embodiment 2, and the machine bodies share a set of control system and exhaust system.

The cooking robot of the present invention, according to various recipes, respectively and quantitatively charges a variety of raw materials, such as meat, vegetables, eggs, milk, fish, oil, salt, sauce, vinegar, sugar and water, required by the dishes into the independent sealed sections of the raw material accommodating device, and carries out a preservation treatment in a food processing plant, and each material box is printed with a bar code or two-dimensional code or provided with a unique identification device containing an electronic tag (RFID) and the like, and contains information such as the name of the dishes. The consumer purchases a raw material box from the supermarket or through the Internet distribution, places the raw material box into the cooking robot, the control system automatically reads and identifies the type of dishes and acquires the whole process of the dishes through the Internet or reading local memory, the process refers to first turning on the air exhaust system, overturning the pot lid, turning the raw material box downward and vertically moving it to an appropriate height, igniting (powering on) the stove, when the control system detects the temperature in the pot reached to a proper temperature, opening the package of an edible oil chamber on the raw material box by using the manipulator, pouring the oil into the pot, detecting the oil temperature in real time, and then putting the raw materials according to the program order, and simultaneously adjusting the fire (heating power), overturning a pot lid system as required to cover the pot lid and stir-frying through a stir-frying mechanism in the pot lid system, repeating the above processes of charging, covering the pot lid, stir-frying and the like according to the process for several times, automatically and quantitatively filling water as required through the water filling nozzle, and automatically turning off the fire after all the processes are accomplished. In the present invention, the stove body and the pot may be fixed together, and the fried dishes can be poured into a container preset below the stove just by overturning the pot. At this moment, the system makes a sound or voice to inform people to take the dishes away. After the dishes are removed, the system automatically turns into a cleaning state, hot water and cleaning agent are sprayed from a plurality of spray nozzles placed at an inner surface of a sealed box body to clean the pot, the pot lid and the like, and the sewage flows into a dirt port below the box body. And then a next cycle is started.

The invention claimed is:

1. A cooking robot, comprising a machine body, a feeding mechanism, a charging mechanism, a control system, a cooking mechanism and a dishes collecting mechanism, characterized in that the control system is respectively connected to the feeding mechanism, the charging mechanism, the cooking mechanism and the dishes collecting mechanism, and configured to control the mechanisms to work;

the feeding mechanism comprises a feed inlet, a positioning bin and a raw material accommodating device, wherein the raw material accommodating device is of a structure which is independent from the feed inlet and the positioning bin and is detached from the cooking robot; a plurality of independent sections, configured to respectively accommodate the corresponding raw materials hermetically, are provided at the raw material accommodating device according to the actual demand of the raw materials required for cooking the dishes; the raw material accommodating device is provided with an identification device; the control system is configured to identify the dishes required to be cooked in the raw material accommodating device through the identification device, and control the charging mechanism to charge the raw materials accommodated in the sections of the raw material accommodating device into the cooking mechanism according to the cooking requirement of the corresponding dishes for cooking; the control system adds, deletes, replaces or updates the recipes by storage in advance, an external memory device or a network afterwards;

the dishes in the raw material accommodating device are respectively and independently packaged in the independent sections according to the recipes in the factory and delivered through a manner of uniform order by the factory;

the charging mechanism comprises a dismantling device and a relative movement system, the relative movement system being connected to the cooking mechanism, the dismantling device or the positioning bin, in order to realize the relative movement between at least two of the positioning bin, the dismantling device and the cooking mechanism;

the relative movement system comprises at least one lifting mechanism; the cooking mechanism, the dismantling device and the positioning bin share one lifting mechanism or are respectively provided with a lifting mechanism;

the dismantling device is of a mechanical structure which moves to the raw material accommodating device under the control of the control system, and opens the corresponding sealed sections so as to charge the raw materials stored in the sealed sections.

2. The cooking robot according to claim 1, characterized in that the identification device is a bar code, a two-dimensional code or an RFID electronic tag; the raw material accommodating device accommodates the raw materials required by one or more dishes, and is a recyclable raw material accommodating device or a disposable raw material accommodating device.

3. The cooking robot according to claim 2, characterized in that the cooking mechanism, comprising a pot body, a heating device, a stir-frying mechanism and a first overturning mechanism, is arranged between the feeding mechanism and the dishes collecting mechanism, wherein the pot body and the heating device are connected to the machine body through the first overturning mechanism, and the pot body and the heating device are of a pot-stove integrated structure or a pot-stove separated structure; the heating device is an electric heating device or a gas heating device; the cooking mechanism also comprises a pot lid and a second overturning mechanism, the pot lid being connected to the machine body through the second overturning mechanism, and a non-open end of the pot lid and the positioning bin being configured to be in fixed connection or detachable connection; the dishes collecting mechanism comprises a dishes collecting container inlet and a dishes container bracket.

4. The cooking robot according to claim 1, characterized in that the control system comprises a host, a display and a drive device, the drive device being respectively connected to the feeding mechanism, the charging mechanism, the control system, the cooking mechanism and the dishes collecting mechanism; the display is provided on an outer surface of the machine body; a control program, configured to display a control menu or a control interface for a user to control the cooking robot, is arranged inside the host; the control system further comprises a wired or wireless communication module, the communication module being connected to the host for receiving remote control information; the control system further comprises an infrared signal transceiver for receiving control signals of a remote controller.

5. The cooking robot according to claim 4, characterized in that the cooking mechanism, comprising a pot body, a heating device, a stir-frying mechanism and a first overturning mechanism, is arranged between the feeding mechanism and the dishes collecting mechanism, wherein the pot body and the heating device are connected to the machine body through the first overturning mechanism, and the pot body and the heating device are of a pot-stove integrated structure or a pot-stove separated structure; the heating device is an electric heating device or a gas heating device; the cooking mechanism also comprises a pot lid and a second overturning mechanism, the pot lid being connected to the machine body through the second overturning mechanism, and a non-open end of the pot lid and the positioning bin being configured to be in fixed connection or detachable connection; the dishes collecting mechanism comprises a dishes collecting container inlet and a dishes container bracket.

6. A cooking robot, characterized in that the robot comprises at least two machine bodies of the robot according to claim 4, and the machine bodies of the robot share a set of control system and exhaust system.

7. The cooking robot according to claim 1, characterized in that the cooking mechanism, comprising a pot body, a heating device, a stir-frying mechanism and a first overturning mechanism, is arranged between the feeding mechanism and the dishes collecting mechanism, wherein the pot body and the heating device are connected to the machine body through the first overturning mechanism, and the pot body and the heating device are of a pot-stove integrated structure or a pot-stove separated structure; the heating device is an electric heating device or a gas heating device; the cooking mechanism also comprises a pot lid and a second overturning mechanism, the pot lid being connected to the machine body through the second overturning mechanism, and a non-open end of the pot lid and the positioning bin being configured to be in fixed connection or detachable connection; the dishes collecting mechanism comprises a dishes collecting container inlet and a dishes container bracket.

8. The cooking robot according to claim 7, characterized in that a fume and air exhaust mechanism and a pollutant filtering device, which are connected to the control system through the drive device so as to work under the control of the control system, are arranged inside the machine body; a water supply system, comprising a water filling nozzle and a plurality of spray nozzles, is also arranged inside the machine body, and the water supply system is an external water pipe or a built-in drinking water bucket; the water supply system is connected to the control system through the drive device, and configured to wash the cooking mechanism or fill the water to the cooking mechanism under the control of the control system; a plurality of drain outlets are further provided at the machine body; a drying device or a sterilizing device, connected to the control system through the drive device so as to dry the cooking mechanism under the control of the control system, is further provided at the machine body; and the sterilizing device is connected to the control system through the drive device so as to sterilize the cooking mechanism and the robot under the control of the control system.

9. The cooking robot according to claim 8, characterized in that the cooking robot is further provided with an automatic feeding system and an automatic waste recovery system; the automatic feeding system and the automatic waste recovery system are respectively connected to the control system; the control system is configured to control the automatic feeding system to feed the raw material accommodating device to the feed inlet, and control the automatic waste recovery system to recover the empty raw material accommodating device and the waste raw materials; an automatic dishes container pushing system and a dishes storage system, which are respectively connected to the control system, are further provided at the cooking robot; the control system is configured to control the automatic dishes container pushing system to actively add the dishes container to the dishes collecting container inlet, and control the dishes storage system to store the accomplished dishes.

10. The cooking robot according to claim 9, characterized in that the automatic feeding system comprises at least one storage bin for the raw material accommodating device, the storage bin for the raw material accommodating device being connected to one side of the machine body provided with the feed inlet, and provided with a second lifting device and a first pushing mechanism; the storage bin for the raw material accommodating device is provided with a fresh keeping or freezing device; the automatic waste recovery system at least comprises a recovering bin for the empty raw material accommodating device, the recovering bin for the empty raw material accommodating device being connected to one side of the machine body not connected to the feed inlet, and a recovering port for the empty raw material accommodating device is arranged at the connecting position of the machine body the same height as the feed inlet, and a third lifting device is provided at the recovering bin for the empty raw material accommodating device; and a raw material accommodating device conveyer is provided at the positioning bin of the feeding mechanism.

11. The cooking robot according to claim 1, characterized in that a fume and air exhaust mechanism and a pollutant filtering device, which are connected to the control system through the drive device so as to work under the control of the control system, are arranged inside the machine body; a water supply system, comprising a water filling nozzle and a plurality of spray nozzles, is also arranged inside the machine body, and the water supply system is an external water pipe or a built-in drinking water bucket; the water supply system is connected to the control system through the drive device, and configured to wash the cooking mechanism or fill the water to the cooking mechanism under the control of the control system; a plurality of drain outlets are further provided at the machine body; a drying device or a sterilizing device, connected to the control system through the drive device so as to dry the cooking mechanism under the control of the control system, is further provided at the machine body; and the sterilizing device is connected to the control system through the drive device so as to sterilize the cooking mechanism and the robot under the control of the control system.

12. The cooking robot according to claim 1, characterized in that the cooking robot is further provided with an automatic feeding system and an automatic waste recovery system; the automatic feeding system and the automatic waste recovery system are respectively connected to the control system; the control system is configured to control the automatic feeding system to feed the raw material accommodating device to the feed inlet, and control the automatic waste recovery system to recover the empty raw material accommodating device and the waste raw materials; an automatic dishes container pushing system and a dishes storage system, which are respectively connected to the control system, are further provided at the cooking robot; the control system is configured to control the automatic dishes container pushing system to actively add the dishes container to the dishes collecting container inlet, and control the dishes storage system to store the accomplished dishes.

13. The cooking robot according to claim 12, characterized in that the automatic feeding system comprises at least one storage bin for the raw material accommodating device, the storage bin for the raw material accommodating device being connected to one side of the machine body provided with the feed inlet, and provided with a second lifting device and a first pushing mechanism; the storage bin for the raw material accommodating device is provided with a fresh keeping or freezing device; the automatic waste recovery system at least comprises a recovering bin for the empty raw material accommodating device, the recovering bin for the empty raw material accommodating device being connected to one side of the machine body not connected to the feed inlet, and a recovering port for the empty raw material accommodating device is arranged at the connecting position of the machine body the same height as the feed inlet, and a third lifting device is provided at the recovering bin for the empty raw material accommodating device; and a raw material accommodating device conveyer is provided at the positioning bin of the feeding mechanism.

14. The cooking robot according to claim 13, characterized in that the automatic dishes container pushing system at least comprises a dishes container storage bin, the dishes container storage bin being connected to one side of the machine body provided with the dishes collecting container inlet, and provided with a fourth lifting mechanism and a container pushing mechanism; the dishes container storage bin is provided with a sterilizing device; the dishes storage system comprises at least one dishes storage bin; the dishes storage bin is connected to one side of the machine body not connected to the dishes collecting container inlet, and a dishes container outlet is arranged at the connecting position the same height as the dishes collecting container inlet, and an automatic lifting shelf is provided at the dishes storage bin; a dishes container conveyer is arranged on the dishes container bracket; a heat preservation device is provided at the dishes storage bin.

15. A cooking robot, characterized in that the robot comprises at least two machine bodies of the robot according to claim 14, and the machine bodies of the robot share a set of control system and exhaust system.

16. A cooking robot, characterized in that the robot comprises at least two machine bodies of the robot according to claim 1, and the machine bodies of the robot share a set of control system and exhaust system.

* * * * *